US009256757B2

(12) United States Patent
Brucker et al.

(10) Patent No.: US 9,256,757 B2
(45) Date of Patent: Feb. 9, 2016

(54) PREFETCH OF ATTRIBUTES IN EVALUATING ACCESS CONTROL REQUESTS

(75) Inventors: Achim D. Brucker, Karlsruhe (DE); Helmut Petritsch, Karlsruhe (DE)

(73) Assignee: SAP SE, Walldorf (DE)

(*) Notice: Subject to any disclaimer, the term of this patent is extended or adjusted under 35 U.S.C. 154(b) by 1328 days.

(21) Appl. No.: 12/817,948

(22) Filed: Jun. 17, 2010

(65) Prior Publication Data
US 2011/0314261 A1 Dec. 22, 2011

(51) Int. Cl.
G06F 7/04 (2006.01)
G06F 17/30 (2006.01)
G06F 21/62 (2013.01)
H04L 29/06 (2006.01)

(52) U.S. Cl.
CPC .... G06F 21/6218 (2013.01); *G06F 2221/2141* (2013.01); *H04L 63/102* (2013.01)

(58) Field of Classification Search
CPC .......................... G06F 21/6218; H04L 63/102
USPC ............. 726/1–2, 27; 713/182; 709/225, 229; 707/781, 783, 785, 787
See application file for complete search history.

(56) References Cited

U.S. PATENT DOCUMENTS

| | | | |
|---|---|---|---|
| 7,023,852 B1* | 4/2006 | Mar et al. ...................... 370/392 |
| 7,216,125 B2* | 5/2007 | Goodwin | |
| 7,814,534 B2* | 10/2010 | Dillaway ........................... 726/4 |
| 2001/0023421 A1* | 9/2001 | Numao et al. ..................... 707/9 |
| 2004/0117371 A1* | 6/2004 | Bhide et al. ....................... 707/9 |
| 2007/0283443 A1* | 12/2007 | McPherson et al. ............ 726/26 |
| 2009/0205018 A1* | 8/2009 | Ferraiolo et al. ................. 726/1 |
| 2009/0320093 A1* | 12/2009 | Glazier et al. .................... 726/1 |
| 2011/0264816 A1* | 10/2011 | Lischka ........................ 709/229 |

OTHER PUBLICATIONS

Keith Irwin; Preventing Attribute Information Leakage in Automated Trust Negotiation; Nov. 2005; ACM, pp. 1-10.*
Ardagna, Claudio A., et al., "An XACML-based privacy-centered access control system", *Proceedings of the first ACM workshop on Information security governance,* (2009), 49-58 Nov. 13, 2009.
Bricker, Achim D, et al., "Idea: Efficient Evaluation of Access Control Constraints", *LNCS* 5965, 2010 , 157-165 2010.
Chadwick, David, "Coordinated decision making in distributed applications", *Information Security Technical Report* 12(3), (2007), 147-154 2007.
Mankai, Mahdi, et al., "Access Control Policies: Modeling and Validation", *Proceedings of the 5th NOTERE Conference,* (2005), 85-91 Aug. 2005.

(Continued)

*Primary Examiner* — Monjour Rahim
(74) *Attorney, Agent, or Firm* — Schwegman Lundberg & Woessner, P.A.

(57) ABSTRACT

In an embodiment, a method is provided for prefetching attributes used in access control evaluation. In this method, an access control policy that comprises rules is retrieved. These rules further comprise parameters. At least one of the rules is categorized into a class from multiple classes based on at least one of the parameters. Here, the class is a grouping based on at least one of these parameters. An attribute associated with the at least one of these parameters is identified and this attribute is mapped to the class.

20 Claims, 7 Drawing Sheets

(56) References Cited

OTHER PUBLICATIONS

Sivasubramanian, Dhivya, "Automated Access Control Policy Testing Through Code Generation", [Online]. Retrieved from the Internet: <URL: http://www.lib.ncsu.edu/theses/available/etd-06282007-092533/unrestricted/etd.pdf>, 67 pgs 2007.
Sun's XACML Implementation http://sunxacml.sourceforge.net/ Last updated on Jul. 16, 2004—2 pgs.

* cited by examiner

PREFETCH OF ATTRIBUTES IN EVALUATING ACCESS CONTROL REQUESTS

FIELD

The present disclosure relates generally to computer security. In an example embodiment, the disclosure relates to prefetch of attributes in evaluating access control requests.

BACKGROUND

In computer security, business requirements for modern enterprise systems usually comprise a variety of dynamic constraints, such as constraints that limit the access of data to authorized users only. Particularly, in highly distributed systems, such as enterprise systems based on service oriented architecture paradigm, the time for evaluating access control constraints depends on the protocol between a central policy decision point and distributed policy enforcement points. In an example of a distributed enterprise system, various distributed policy enforcement points, which are embedded into different client applications, communicate with a centralized policy decision point. In this system, some attributes used for evaluations of access control requests are only accessible from the client applications. Accordingly, resolving attributes often require substantial network communication between the centralized policy decision point and the various distributed policy enforcement points.

One particular approach to resolving attributes is a trial and error approach where the centralized policy decision point requests the required attributes from the policy enforcement points in an iterative methodology. For example, if the evaluation of—an access control request requires a service attribute, the policy decision point returns the missing attribute message back to the client, including information about the missing attribute. As the policy decision point is usually stateless where it does not store the lat request, the initial request has to be resubmitted by the policy enforcement point with the requested attribute. However, if another service attribute is required, the policy decision point returns, once again, a missing attribute request to the policy enforcement point. This process is done repeatedly until all required attributes are resolved. Furthermore, the evaluation of access control requests is repeated every time the policy enforcement point submits a new request. This trial and error approach requires substantial network communication between the centralized policy decision point and the various distributed policy enforcement points, thereby possibly delaying the evaluation of access control requests.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for prefetching attributes in the evaluation of access control requests. Here, all the attributes that are required to evaluate certain control requests are initially identified. Before the evaluation process is started, all the identified attributes are retrieved and provided to a centralized policy decision point module for use in the evaluation. In effect, all the required attributes are prefetched before the start of the evaluation process. As explained in more detail below, a mapping of the attributes is constructed for use in the prefetch.

Figure 1:
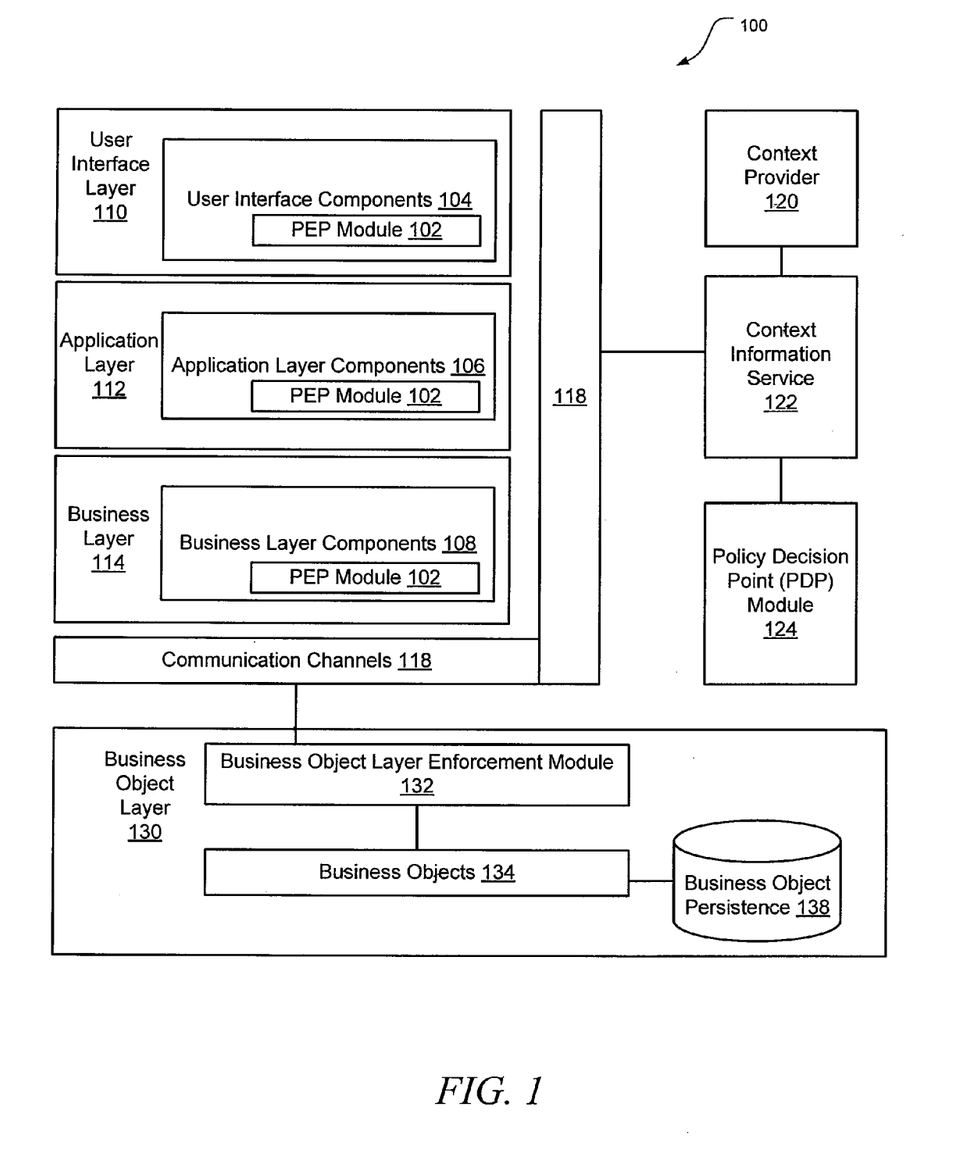
FIG. 1 is a block diagram depicting an enterprise system, in accordance with an example embodiment.

FIG. 1 is a block diagram depicting an enterprise system 100, in accordance with an example embodiment. The enterprise system 100 has a service oriented architecture that includes a user interface layer 110, an application layer 112, a business layer 114, a context provider 120, a context information service 122, a policy decision point (PDP) module 124, and a business object layer 130. The different layers 110, 112, and 114 communicate with the context information service 122 and the business object layer 130 by way of communication channels 118. It should be noted that in this embodiment, the different layers 110, 112, 114 do not directly communicate with the context information service 122. Instead, the different layers 110, 112, and 114 communicate with the context information service 122 by way of the policy enforcement point (PEP) module 102, as explained below.

In general, a service oriented architecture provides business services by orchestrating a set of loosely coupled technical services, such as the user interface components 104, the application layer components 106, and the business layer components 108. However, access control (e.g., authentication and authorization) in such an enterprise system 100 relies on one or more centralized components. In one embodiment, a centralized PDP module 124 is used for evaluating access control policies. A PDP is a logical entity that makes security related decisions. For example, a PDP in the form of the PDP module 124 can make authorization decisions in response to access control requests to access resources on a computer or network server. Particularly, as explained in more detail below, the PDP module 124 in one embodiment stores access control policies for some or all secured services and evaluates access control requests using these policies. For example, if the application layer components 106 need to identify whether a user can access a particular business object or other resources stored in the business object layer 130, then the application layer components 106 need to query the PDP module 124. Similarly, if the business layer components 108 need to identify whether a particular business object stored in the same business object layer 130 is accessible, then these business layer components 108 also need to query the same PDP module 124. It should be noted that the business objects 134 may be validated by the business object layer enforcement module 132 and stored in the business object persistence 138. Although a single PDP module 124 is depicted in FIG. 1, the enterprise system 100 may include multiple PDP modules.

Unlike the centralized evaluation of access control requests, the enforcement of such policies is decentralized. Here, a PEP module 102 is embedded in each secured service, such as the user interface components 104, the application layer components 106, and the business layer components 108. Generally, a PEP is the logical entity that enforces security related decisions made by the PDP. In other words, the PEP ensures the conformance of one or more access control policies. Furthermore, each different layer 110, 112, or 114 or other secured services may communicate with the PDP module 124 for access control decisions by way of the embedded PEP modules 102.

The context information service 122 is configured to provide different types of attributes to the PDP module 124. As also explained in more detail below, the context provider 120, which is in communication with the context information service 122, is configured to resolve or retrieve global and PDP attributes, as explained in detail below.

Figure 2A:
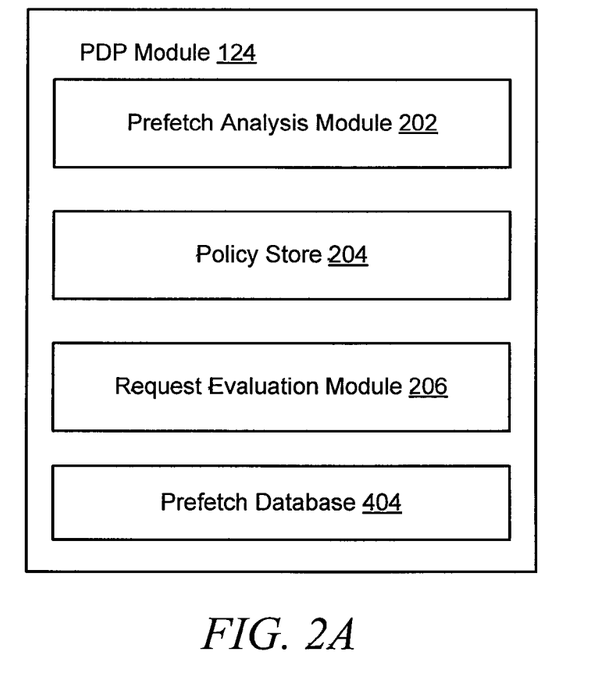
FIGS. 2A and 2B are block diagrams depicting example embodiments of the policy decision point (PDP) module and the PDP module.
Figure 2B:
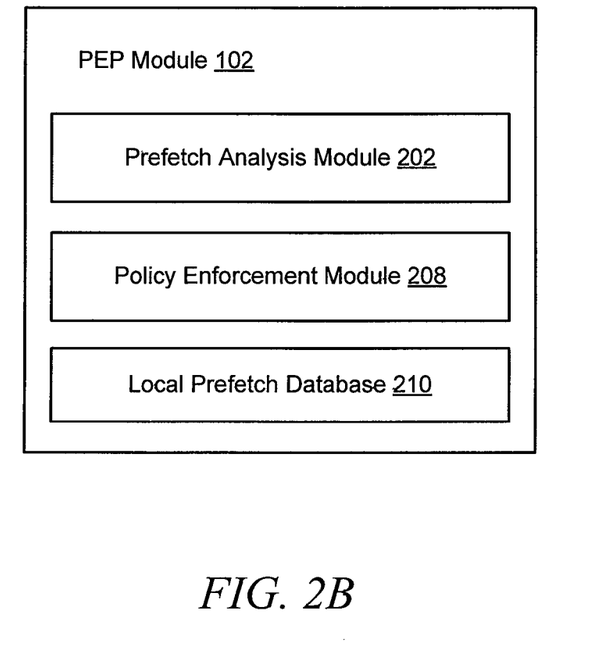

FIGS. 2A and 2B are block diagrams depicting example embodiments of the PDP module 124 and the PEP module 102. It should be appreciated that the PDP module 124 and the PEP module 102 may be deployed in a computing device, such as a personal computer, a laptop computer, a server computer, a tablet personal computer, a personal digital assistant, or other computing devices. The PDP module 124 and the PEP module 102 may be included in an enterprise system, such as the enterprise system 100 depicted in FIG. 1. Still referring to FIGS. 2A and 2B, the PDP module 124 and the PEP module 102 may be implemented using computer programs, logic, applications, methods, processes, or software to prefetch attributes in evaluations of access control requests, as described in more detail below.

In the embodiment depicted in FIG. 2A, the PDP module 124 includes various modules, such as a prefetch analysis module 202, a policy store 204, a prefetch database 404, and a request evaluation module 206. The prefetch analysis module 202 is configured to prefetch all attributes used by access control policies, which are stored in the policy store 204. Generally, an "attribute" refers to information about a subject or an object (e.g., a system resource). The attribute may also refer to general context information (e.g., the current time or system load) or other information describing the system and/or environment. For example, an attribute may be a value of a business object. Particular examples of attributes include owner name, shipping destination, last modification date, and other attributes. In one embodiment, each attributes can be categorized into one of three subsets, namely a PDP attribute, a service attribute, or a global attribute. The PDP attribute is an attribute that is available within a centralized security infrastructure, such as the PDP module 124. An example of such a PDP attribute is information regarding a role hierarchy membership. The service attribute is an attribute that is available within a client application or service, such as components 104, 106, and 108 within the user interface layer 110, the application layer 112, and the business layer 114, as depicted in FIG. 1. Examples of service attributes include an owner of a resource, a specific attribute of a resource (e.g., a balance of a bank account), or a number of threads running on an application server hosting a service. A global attribute is an attribute that is resolvable by or included in both the central security infrastructure (e.g., PDP module 124) and the client application or service. A system time is an example of a global attribute that is available to both the PDP module 124 and the client application or service. Another example of a global attribute is authentication information. As discussed above, the context provider 120 in the enterprise system 100 is configured to resolve or retrieve the global and PDP attributes. In contrast, the service attribute may be resolved by a different module, such as a service attribute resolver module, as described in more detail below. However, the context provider 120 may also be able to access and resolve the service attributes by way of communication channels. The categorization of these attributes into different categories may, in one example, be used to optimize access control evaluations. For example, instead of retrieving or resolving all attributes, embodiments of the present invention can focus on prefetching service attributes from the client applications or services because, for example, the PDP module 124 can resolve the other global and PDP attributes itself without communication to the client applications or services.

Returning to FIG. 2A, the request evaluation module 206 is configured to provide access control decisions in response to access control requests received from client applications or services. The request evaluation module 206 makes such access control decisions based on relevant policies and their attributes. The prefetch database 404 stores a pre-computed mapping of attributes to classes, as discussed in more detail below.

As depicted in FIG. 2B, the PEP module 102 includes various modules, such as the prefetch analysis module 202, a policy enforcement module 208, and a local prefetch database 210. The prefetch analysis module 202 prefetches the attributes used in access control evaluations. The policy enforcement module 208 generally enforces the actions specified by the access control policies. As explained in more detail below, the policy enforcement module 208 also retrieves relevant attributes and communicates access control requests to the PDP module 124. The local prefetch database 210 stores a listing of attributes potentially needed in the evaluation of access control requests, as also explained in more detail below.

It should be appreciated that in other embodiments, the PDP module 124 and the PEP module 102 may include fewer, more, or different modules apart from those shown in FIGS. 2A and 2B. For example, in an alternate embodiment, the prefetch analysis module 202 depicted in FIG. 2A may be excluded from the PDP module 124. Here, the prefetch analysis module 202 may be located in a different module or different computing device. In yet another embodiment, the PDP module 124 may only include the request evaluation module 206.

Figure 3:
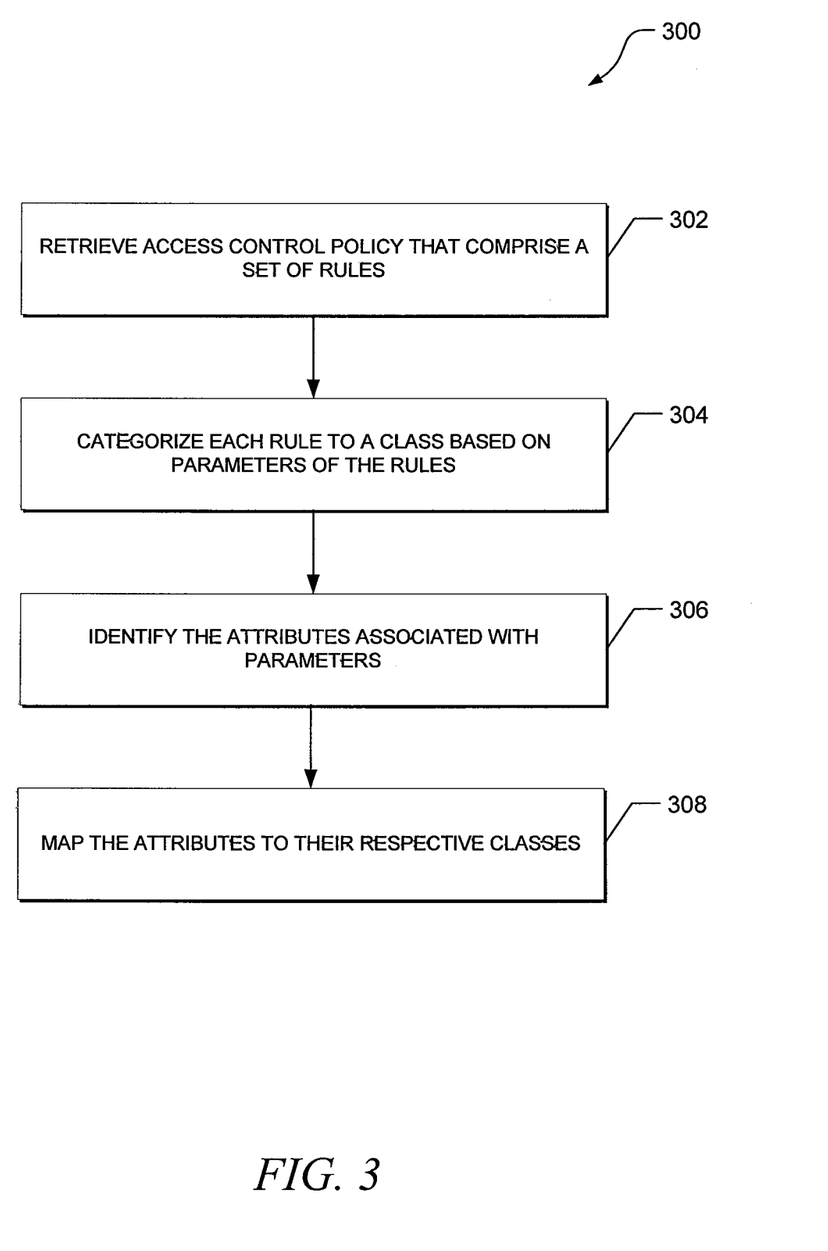
FIG. 3 is a flow diagram of a general overview of a method, in accordance with an example embodiment, for constructing a mapping of attributes used in the prefetch.

FIG. 3 is a flow diagram of a general overview of a method 300, in accordance with an example embodiment, for constructing a mapping of attributes used in the prefetch. In an example embodiment, the method 300 may be implemented by the prefetch analysis module 202 depicted in FIGS. 2A and 2B. As depicted in FIG. 3, one or more access control policies are retrieved at 302. An access control policy comprises a set of rules and each rule is a prescribed method or procedure for evaluating access control requests. An access control request can be mapped to an access control decision (e.g., deny or allow), and one or more rules generally describe this mapping. An access control policy is a mapping of rules to access control decisions.

In one embodiment, a rule may be defined by four parameters (g, r, a, c) where g is a role, r is a resource, a is an action on that resource, and c is a constraint. The role g is a characteristic of a user, such as a manager or administrator. The resource r is an object or data being accessed. Examples of resources r include a file, a task of a business process, and an address of a location on the Internet (e.g., Uniform Resource Locator). The action a is an operation on the resource, such as modify, read, write, and delete. The constraint c is a limitation. For example, the constraint may be a condition that needs to be satisfied before the effect of a rule (e.g., permit or deny) is applied. An example of a constraint c is current time between 8:00 AM and 5:00 PM. Another example of a constraint c is a user is to be the owner of a resource. The following Table A illustrates an example of an eXtensible Access Control Markup Language (XACML) access control policy, which is syntactically simplified, with rules having parameters (g, r, a, c).

TABLE A

```
<Policy RuleCombAlg ="first - applicable ">
    <Target >
        <Resource >TravelRequest </ Resource >
    </ Target >
    <Rule Effect =" Deny ">
        <Target >
            <Action >approve </ Action >
        </ Target >
        <Constraint FunctionId ="string - equal ">
            <Attribute >subject </ Attribute >
            <Attribute >requestor </ Attribute >
        </ Constraint >
    </ Rule >
    <Rule Effect =" Permit ">
        <Target >
            <Role >ManagerRole </ Role >
            <Action >approve </ Action >
        </ Target >
        <Constraint FunctionId =" isTrue ">
            <Attribute > areBusinessHours </ Attribute >
        </ Constraint >
    </ Rule >
</ Policy >
```

In general, the example of the XACML access control policy depicted in Table A manages a travel approval process for which a first rule prohibits an employee from approving his own business travels. Additionally included is a second rule dictating that travel requests can only be approved during business hours (e.g., between 8:00 AM and 6:00 PM) from users with the role "ManagerRole." The travel request "TravelRequest" is a resource r and the approval "approve" is an action a. In this access control policy, a check is conducted within a constraint c to determine whether a user claiming this task, which can be obtained by resolving the attribute "subject," is different from a user that requested the travel, which may be obtained by resolving the attribute "requestor" (first rule). Moreover, while modeling the constraint c during business hours, the time can be accessed by resolving the attribute "areBusinessHours" (second rule).

After the retrieval of the access control policies, each rule included in the access control policies is categorized at 304 into a particular class based on parameters of the rules. As used herein, a "class" refers to a grouping of rules based on similar or identical parameters. That is, a class is a grouping of rules all having a similar or identical set of parameters. However, each class in a number of different classes is a grouping based on a different set of parameters. In the example using XACML, a class may be a grouping of rules all having parameters (g1, r1). Another class may be a grouping of all rules having parameters (r2, a1). In yet another example, a different class may be a grouping of all rules having parameter (g1). In still yet another example, a class may be a grouping of all rules having parameters (g1, r2, a1).

Still referring to FIG. 3, the attributes associated with the parameters in each class is identified at 306. For example, all the attributes associated with constraints listed in a rule are retrieved. With the attributes identified, each attribute is mapped to its respective class at 308. It should be appreciated that a rule comprises parameters and attributes. As discussed above, a rule may be categorized into a particular class based on its parameters. Accordingly, all the attributes that comprise the rule can be mapped to the same class. The following Table B illustrates a mapping of attributes to their respective class.

TABLE B

| | |
|---|---|
| class (g1, r1) | Attribute A, Attribute B, Attribute C |
| class (g1, r2, a1) | Attribute B, Attribute D, Attribute E |
| class (g1) | Attribute R, Attribute G |

The example of the mapping depicted in Table B shows that the set of Attributes A, B, and C are mapped to a class defined by parameters (g1, r1). However, Attributes B, D and E are mapped to a different class defined by parameters (g1, r2, a1). Attributes R and G are mapped to another class defined by parameter (g1). In one embodiment, the mapping may be stored in a database table where each different class may be identified as a key value in the database table. As a result, the set of the attributes associated with a particular class may be quickly identified by looking up the key value assigned to the particular class in the database table.

In a more detailed example of mapping services attributes to their respective classes (g, r, a) using XACML, for a given access control policy P:

(1) For each rule (g, r, a, c) in the policy P, a four-tuples (g, r, a, $A_S(c)$) is computed, where $A_S(c)$ is the set of service attributes that are syntactically referenced in the access control constraint c. This set can be computed by traversing the representation of c in its abstract syntax.

(2) The set of four-tuples (g, r, a, $A_S(c)$) is categorized into a class with respect to its lexicographic order of the triple (g, r, a).

(3) In each class, the—union of all required sets of service attributes is built. That is, given $\{((g, r, a, A_S(c_1)), \ldots, ((g, r, a, A_S(c_n))\}$, the triple $(g,r,a \cup_{1 \leq i \leq n} A_S(C_i))$ is computed.

(4) The consolidated set of triples may be used as input for initializing a hash table used in PDP configuration.

It should be appreciated that a prefetch analysis module may create this mapping of the attributes, using the technique described in method 300, when a new policy is defined or when a policy has been updated or modified. This mapping may be stored in, for example, a prefetch database that is included in a PDP module. In addition to the creation of this mapping, the prefetch analysis module may also handle various requests and responses to and from one or more PEP modules, as described in more detail below.

Figure 4:
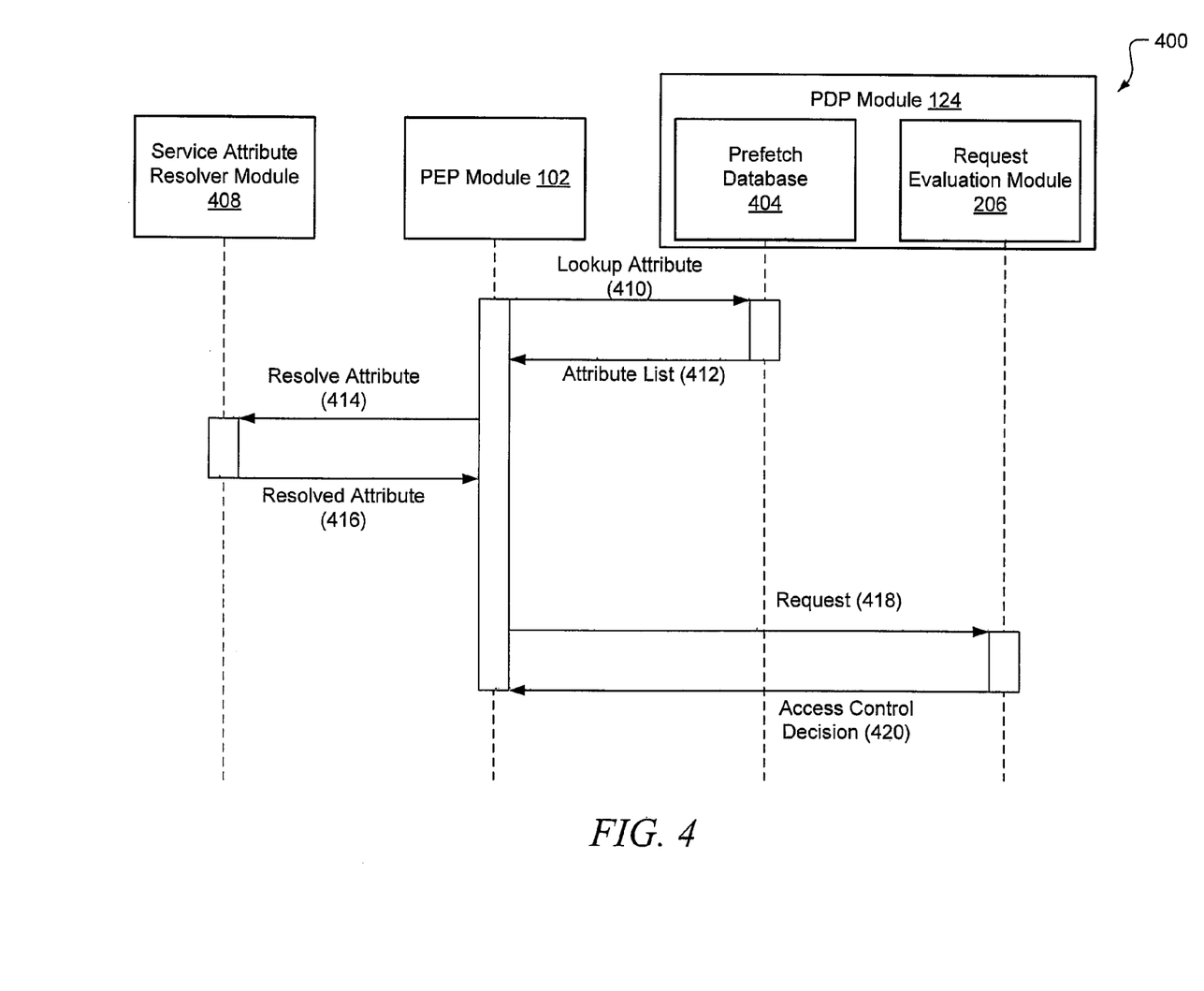
FIG. 4 is a timing diagram depicting the prefetching of attributes in evaluating access control requests, in accordance with an example embodiment.

FIG. 4 is a timing diagram 400 depicting the prefetching of attributes in evaluating access control requests, in accordance with an example embodiment. The timing diagram 400 shows the interactions between a service attribute resolver module 408, a PEP module 102, and/or a PDP module 124 at, for example, an enterprise system. In this embodiment, the PDP module 124 includes a prefetch database 404 and a request evaluation module 206. As discussed previously, the PEP module 102 generally enforces access control policies at the client application or service and queries the PDP module 124 for access control decisions. The prefetch database 404, as also discussed previously, stores a pre-computed mapping of attributes to classes. For example, the prefetch database 404 may store a pre-computed lookup table that includes a mapping of classes to a set of required service attributes. The service attribute resolver module 408 is configured to access or retrieve the requested service attribute.

Initially, the PEP module 102 may receive an access control request from a client application or service. The access control request regarding a particular access control policy also comprises a set of parameters. For example, in XAMCL, an access control request can be a triple (u', r', a'), where u' is the requesting user, r' is the resource the user is requesting access for executing action a'. In this example, the PEP module 102 is configured to prefetch all the attributes associated with the access control request having the tuple (r', a') before querying the PDP module 124 for an access control decision. In this example, the u' is not a part of the class definition, and the PDP module 124 can resolve the u' to a g', which can be used as a class. As result, the PEP module 102 looks up the attributes at 410 from the prefetch database 404, and from the mapping in the prefetch database 404, identification can be made to match the access control request having the tuple (r', a') to a particular class based on the parameters associated with the access control request. The attributes associated with the matched class may then be identified from the mapping retrieved from the prefetch database 404.

For example, after system startup, the PEP module 102 queries the prefetch database 404 for all attributes potentially needed for answering access control requests of the form (r', a'), for a resource r' with an action a'. From the mapping, a class defined by parameters (g, r, a) is identified based on a match with the tuple (r', a'). That is, the PDP module 124 identifies a match if user u' is a member of the role g', both r'=r and a'=a hold. For all associated access control constraints, the list of attributes needed for evaluating the constraints (at the time to access control request is evaluated) is computed. With the match, a list of attributes needed for the access control request is transmitted at 412 to the PEP module 102 and stored in, for example, a local prefetch database of the PEP module 102.

Prior to sending an access control request having the triple (u', r', a') to the request evaluation module 206, the PEP module 102 looks up the list of needed attributes from its local prefetch database and resolves the list using the service attribute resolver module 408. Particularly, the PEP module 102 transmits a request at 414 to the service attribute resolver module 408 for the requested attributes as identified in the list. The service attribute resolver module 408 resolves or retrieves the requested attributes and transmits them at 416 to the PEP module 102. At 418, the PEP module 102 then inserts the retrieved attributes into an access control request and transmits the access control request with all requested attributes to the request evaluation module 206. The request evaluation module 206 evaluates one or more policies relevant to the access control request based on the received attributes and generates an access control decision. At 420, the PEP module 102 then receives a response to the access control request with the access control decision from the request evaluation module 206 and enforces the access control decision at the client application or service.

In this embodiment, by examining the parameters associated with an access control request, the PEP module 102 can determine which attributes could be required during the evaluation of an access control request. Accordingly, the PEP module 102 essentially resolves as many or all service attributes that are potentially required and transmits them with the initial access control request to the PDP module 124. As a result, instead of the PDP module 124 transmitting multiple requests for attributes during the evaluation of access control requests, all the attributes needed for their evaluation are received in a single transmission (or single protocol round), thereby possibly resulting in performance increase and lower network load. That is, a single access control request is transmitted to, and a single response is received from the PDP module 124. It should be noted that the attribute lookup (410) can be done just once at startup and after changes in the prefetch database 104 (e.g., after a policy update). However, if the PEP module 102 is not able to resolve a correct set of service attributes initially because the attribute retrieved at 410 is obsolete, the PDP module 124 may use a traditional trial and error approach to retrieve or resolve any missing service attributes with subsequent communications to the PEP module 102.

Figure 5:
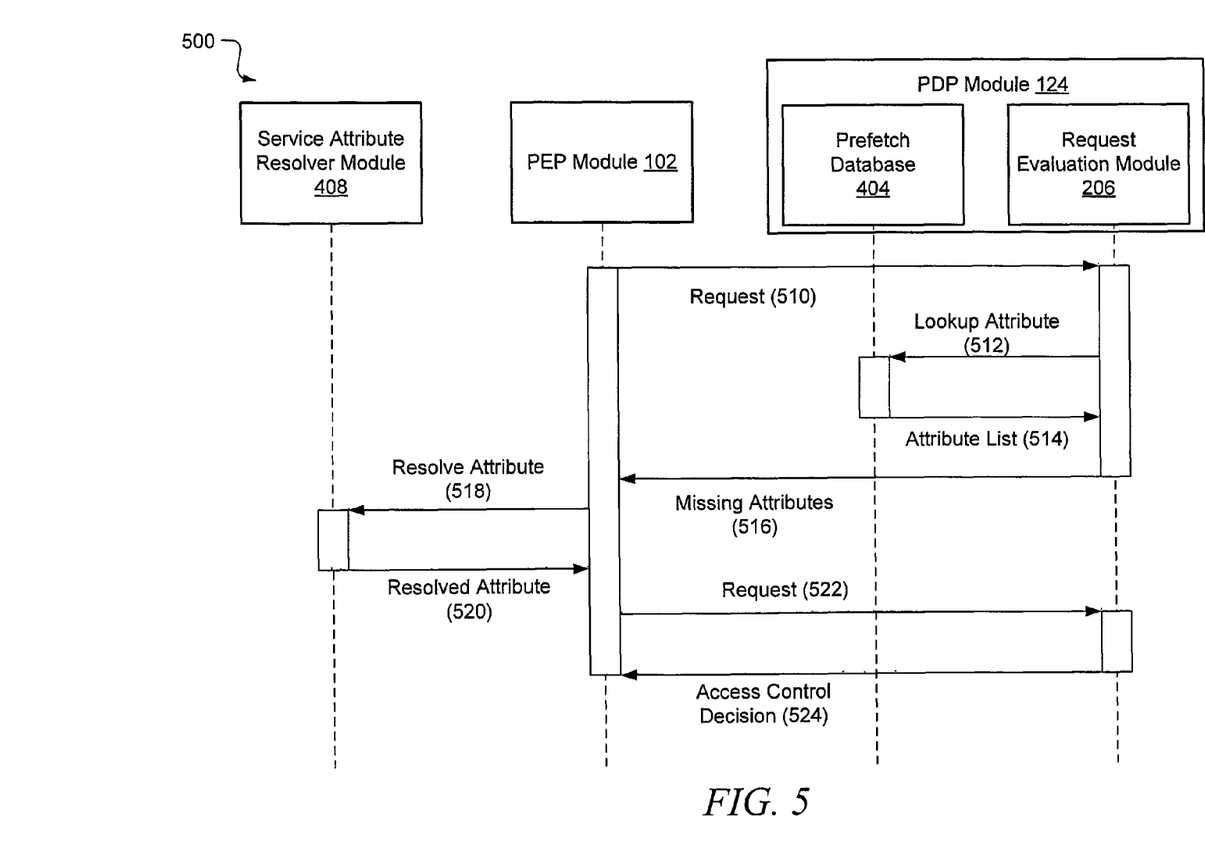
FIG. 5 is a timing diagram depicting a prefetch of attributes in evaluating access control requests, in accordance with another example embodiment.

FIG. 5 is a timing diagram 500 depicting a prefetch of attributes in evaluating access control requests, in accordance with another example embodiment. In this example, the timing diagram 500 shows the interactions between a service attribute resolver module 408, a PEP module 102, and/or a PDP module 124 at, for example, an enterprise system. In this embodiment, the PDP module 124 includes a prefetch database 404 and a request evaluation module 206. Here, the PEP module 102 transmits an access control request at 510 to the PDP module 124. This access control request comprises a set of parameters, and the request evaluation module 206 looks up the attribute at 512 from the mapping stored in the prefetch database 404. From the mapping in the prefetch database 404, the request evaluation module 206 can identify the access control request to match a particular class based on the parameters associated with the access control request. A list of attributes associated with the matched class may then be identified at 514 from the mapping stored in the prefetch database 404. It should be noted that in this example, the request evaluation module 206 looks up the attribute at 512 when the evaluation needs, for example, just one attribute. Instead of looking up just this one attribute, the request evaluation module 206 looks up all possible attributes from the mapping stored in the prefetch database 404.

With the list of attributes needed to evaluate the access control request identified, the request evaluation module 206 then at 516 transmits a response to the access control request. However, this response includes a request to the PEP module 102 for the attributes identified in the list. Upon receipt of this request, the PEP module 102 retrieves the requested service attributes from the service attribute resolver by transmitting another request at 518 to the service attribute resolver module 408. The service attribute resolver module 408 resolves or retrieves the requested attributes and transmits them at 520 to the PEP module 102. At 522, the PEP module 102 then transmits another access control request with all requested attributes to the request evaluation module 206. The request evaluation module 206 then evaluates one or more policies relevant to the access control request based on the received attributes and generates an access control decision. In turn, at 524, the PEP module 102 receives a response to the access control request with the access control decision from the request evaluation module 206 and enforces the access control decision at the client application or service. Accordingly, in this embodiment, the number of evaluation attempts (or protocol rounds) is limited to two protocol rounds, and this number is not dependent on a number of attributes required for the evaluation of the access control request. In an example where service attributes are not requested during evaluation, the embodiment of the technique illustrated in FIG. 5 may not generate additional overhead because there is just a single protocol round.

Figure 6:
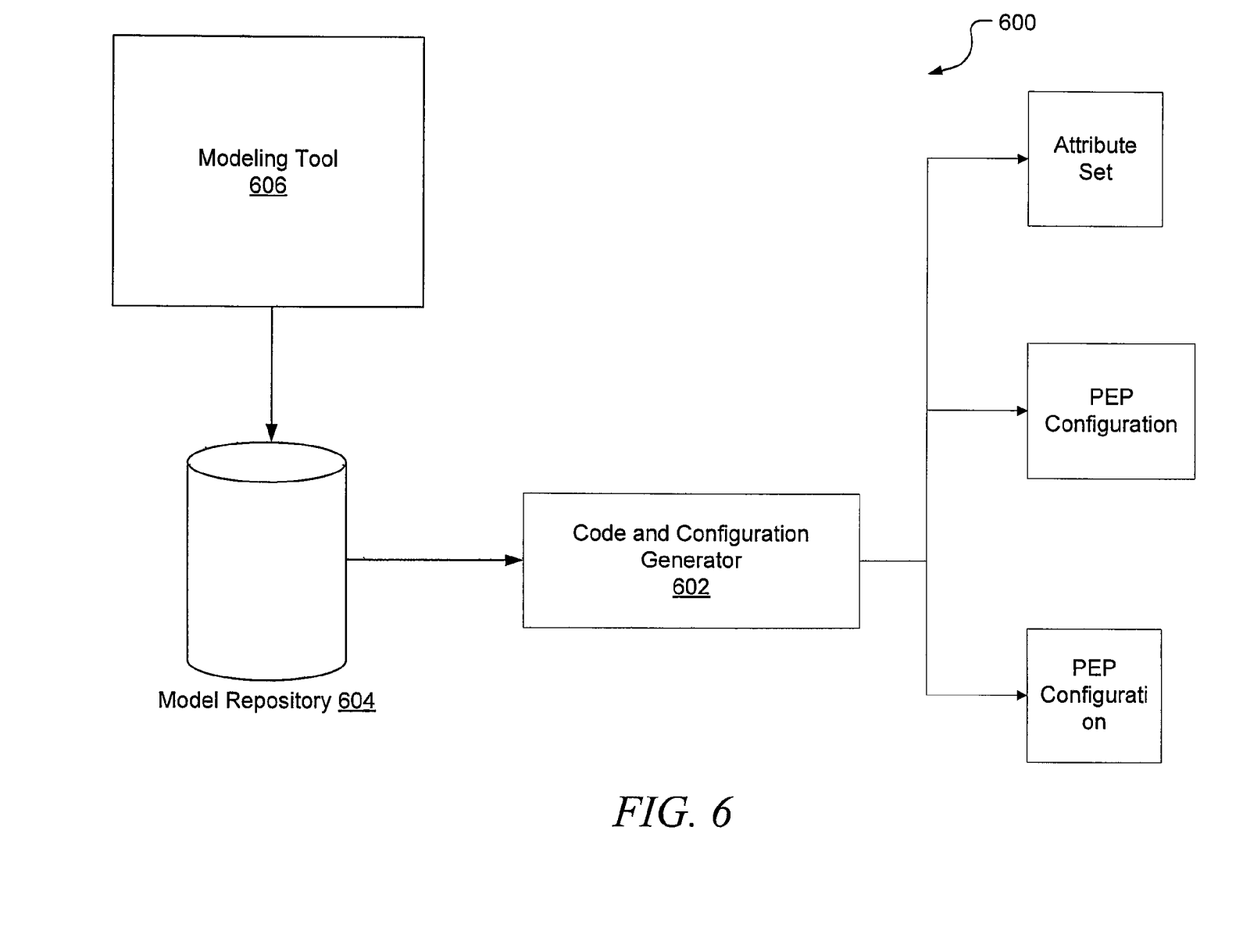
FIG. 6 is a block diagram of a model based report generation system for processing changes in access control policies, in accordance with an example embodiment.

FIG. 6 depicts a block diagram of a model based report generation system 600 for processing changes in access control policies, in accordance with an example embodiment. As depicted, the system 600 includes a modeling tool 606, a model repository 604, and a code and configuration generator 602. The modeling tool 606 is a data modeling tool that models all the attributes that are associated with different classes. Each model can be an abstract description of a particular policy. The model repository 604 stores the models, and the code and configuration generator 602 translates the high-level description of the model into a technical low-level system language.

It should be noted that a policy may change such that it may need more or less attributes. For policy languages supported by a model driven security toolchain, the modified configurations (or even the complete PDP and PEP implementations) can be generated automatically. In particular, the change in the policy is reflected in models within the modeling tool 606, and the code and configuration generator 602 computes or compiles the prefetch attributes and generates additional source code, configuration for the PEP, or even a database containing the prefetch attributes. Such source code and configurations may then be automatically deployed in the PEP module, PDP module, and/or the prefetch database. Accordingly, any suitable policy changes may result in the automatic distribution and update of prefetch attributes.

Figure 7:
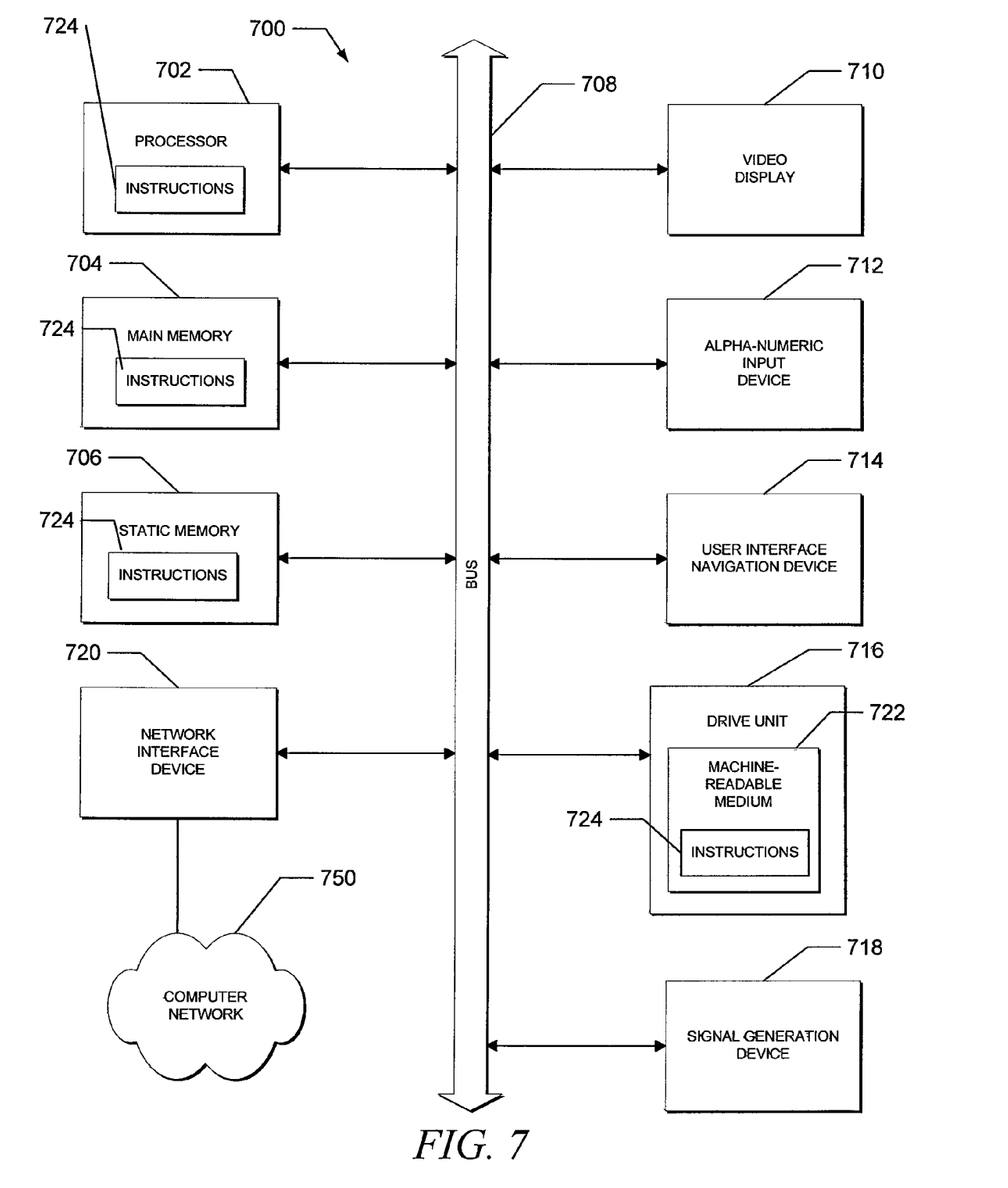
FIG. 7 is a block diagram of a machine in the example form of a computing device within which may be executed a set of instructions for causing the machine to perform any one or more of the methodologies discussed herein.

FIG. 7 depicts a block diagram of a machine in the example form of a computing device 700 within which may execute a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random access memory (RAM)), and static memory 706 (e.g., static RAM), which communicate with each other via bus 708. The computing device 700 may further include video display unit 710 (e.g., a plasma display, a liquid crystal display (LCD) or a cathode ray tube (CRT)). The computing device 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by computing device 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)) and utilizing any one of a number of well-known data encodings (e.g., eXtensible Markup Language (XML)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for prefetch of attributes in evaluating access control requests may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of prefetching attributes used in access control evaluation, the method comprising:
retrieving an access control policy that comprises a plurality of rules, the plurality of rules further comprising a plurality of parameters;
categorizing at least one of the plurality of rules into a class from a plurality of classes based on at least one of the plurality of parameters, the class being a grouping based on the at least one of the plurality of parameters;
identifying an attribute associated with the at least one of the plurality of parameters;
mapping the attribute to the class from the plurality of classes, at least one of the steps being performed by at least one hardware device; and
providing an access control decision based on the attribute and the access control policy.

2. The method of claim 1, further comprising:
receiving an access control request that comprises the at least one of the plurality of parameters;
identifying the access control request to match the class from the plurality of classes based on the at least one of the plurality of parameters;
identifying the attribute associated with the class from the mapping; and
transmitting a response to the access control request, the response including a request for the attribute.

3. The method of claim 2, further comprising:
receiving a further access control request that includes the attribute;
providing a second access control decision based on the attribute and the access control policy; and
transmitting a further response to the further access control request, the further response including the second access control decision.

4. The method of claim 1, further comprising:
accessing an access control request that comprises the at least one of the plurality of parameters;
identifying the access control request to match the class from the plurality of classes based on the at least one of the plurality of parameters;
identifying the attribute associated with the class from the mapping;
retrieving the attribute;
inserting the attribute into the access control request;
transmitting the access control request having the attribute; and
receiving a response to the access control request, the response including the access control decision.

5. The method of claim 1, wherein the plurality of parameters comprise at least one of a role, a resource, an action on the resource, or a constraint.

6. The method of claim 1, wherein at least one of the plurality of parameters includes a constraint, and wherein the identified attribute is associated with the constraint.

7. The method of claim 1, wherein each class from the plurality of classes is a grouping based on a different set of the plurality of parameters.

8. A computing device comprising:
at least one processor; and
a memory in communication with the at least one processor, the memory being configured to store a prefetch analysis module that is executable by the at least one processor, the prefetch analysis module having instructions that when executed by the at least one processor, cause operations to be performed, the operations comprising:
retrieving an access control policy that comprises a plurality of rules, the plurality of rules further comprising a plurality of parameters;
categorizing at least one of the plurality of rules into a class from a plurality of classes based on at least one of the plurality of parameters, the class being a grouping based on the at least one of the plurality of parameters;
identifying an attribute associated with the at least one of the plurality of parameters;
mapping the attribute to the class from the plurality of classes; and providing an access control decision based on the attribute and the access control policy.

9. The computing device of claim 8, wherein the memory is further configured to store a request evaluation module having instructions that when executed by the at least one processor, cause operations to be performed, the operations comprising:
receiving an access control request from a policy enforcement point module, the access control request comprising the at least one of the plurality of parameters;
identifying the attribute associated with the class from the mapping;
identifying the access control request to match the class from the plurality of classes based on the at least one of the plurality of parameters; and
transmitting a response to the policy enforcement point module, the response including a request for the attribute.

10. The computing device of claim 9, further comprising:
receiving a further access control request from the policy enforcement point module, the further access control request including the attribute;
providing a second access control decision based on the attribute and the access control policy; and
transmitting a further response to policy enforcement point module, the further response including the second access control decision.

11. The computing device of claim 8, wherein the memory is further configured to store a policy enforcement module having instructions that when executed by the at least one processor, cause operations to be performed, the operations comprising:
accessing an access control request that comprises the at least one of the plurality of parameters;
identifying the access control request to match the class from the plurality of classes based on the at least one of the plurality of parameters;
identifying the attribute associated with the class from the mapping;
retrieving the attribute;
inserting the attribute into the access control request;
transmitting the access control request having the attribute to a policy decision point module; and
receiving a response from the policy decision point module, the response including the access control decision.

12. The computing device of claim 11, wherein a single access control request is transmitted to the policy decision point module, and wherein a single response is received from the policy decision point module.

13. The computing device of claim 8, wherein the plurality of parameters comprise at least one of a role, a resource, an action on the resource, or a constraint.

14. The computing device of claim 8, wherein the at least one of the plurality of parameters includes a constraint, and wherein the identified attribute is associated with the constraint.

15. A non-transitory machine-readable medium that stores instructions,which, when performed by a machine, cause the machine to perform operations comprising:
retrieving an access control policy that comprises a plurality of rules, the plurality of rules further comprising a plurality of parameters;
categorizing at least one of the plurality of rules into a class from a plurality of classes based on at least one of the plurality of parameters, the class being a grouping based on the at least one of the plurality of parameters;
identifying an attribute associated with the at least one of the plurality of parameters;
mapping the attribute to the class from the plurality of classes;and
providing an access control decision based on the attribute and the access control policy.

16. The non-transitory machine-readable medium of claim 15, further comprising:
receiving an access control request that comprises the at least one of the plurality of parameters;
identifying the access control request to match the class from the plurality of classes based on the at least one of the plurality of parameters;
identifying the attribute associated with the class from the mapping; and
transmitting a response to the access control request, the response including a request for the attribute.

17. The non-transitory machine-readable medium of claim 16, further comprising:
receiving a further access control request that includes the attribute;
providing a second access control decision based on the attribute and the access control policy; and
transmitting a further response to the further access control request, the further response including the second access control decision.

18. The non-transitory machine-readable medium of claim 15, further comprising:
accessing an access control request that comprises the at least one of the plurality of parameters;
identifying the access control request to match the class from the plurality of classes based on the at least one of the plurality of parameters;
identifying the attribute associated with the class from the mapping;
retrieving the attribute;
inserting the attribute into the access control request;
transmitting the access control request having the attribute; and
receiving a response to the access control request, the response including the access control decision.

19. The non-transitory machine-readable medium of claim 15, wherein the plurality of parameters comprise at least one of a role, a resource, an action on the resource, or a constraint.

20. The non-transitory machine-readable medium of claim 15, wherein the at least one of the plurality of parameters includes a constraint, and wherein the identified attribute is associated with the constraint.

* * * * *